US006880768B2

(12) United States Patent
Lau

(10) Patent No.: US 6,880,768 B2
(45) Date of Patent: Apr. 19, 2005

(54) HANDHELD SPRAYING DEVICE WITH QUICK DISCONNECT ASSEMBLY

(75) Inventor: Ping Wa Lau, Tsuen Wan (CN)

(73) Assignee: Jing Mei Industrial Holdings Limited, Avarua (CK)

( * ) Notice: Subject to any disclaimer, the term of this patent is extended or adjusted under 35 U.S.C. 154(b) by 0 days.

(21) Appl. No.: 10/630,229

(22) Filed: Jul. 30, 2003

(65) Prior Publication Data

US 2005/0023379 A1 Feb. 3, 2005

(51) Int. Cl.[7] ............................ B05B 7/02; B05B 9/01; B05B 1/00; F16L 17/00; F16L 19/00

(52) U.S. Cl. ...................... 239/526; 239/525; 239/600; 285/360

(58) Field of Search ................................ 239/526, 525, 239/600; 285/360, 376, 401

(56) References Cited

U.S. PATENT DOCUMENTS 1,942,358 A 1/1934 Grathwol ..................... 230/95
2,212,533 A 8/1940 Zimmerman ................. 299/18
3,131,868 A 5/1964 Coleman .................... 239/277
3,799,453 A 3/1974 Hart ........................... 239/600
4,185,781 A 1/1980 O'Brien ...................... 239/600
4,480,791 A 11/1984 Ward et al. ............ 239/533.15
4,618,100 A 10/1986 White et al. ............... 239/440
4,761,839 A 8/1988 Ganaway ....................... 4/654
5,014,919 A 5/1991 Knapp ........................ 239/579
5,190,224 A 3/1993 Hamilton .................... 239/600
5,333,790 A 8/1994 Christopher ................ 239/391
5,624,073 A 4/1997 Mueller et al. ............ 239/442
5,727,739 A 3/1998 Hamilton .................... 239/600
6,035,477 A 3/2000 Robert .......................... 15/29
6,179,224 B1 1/2001 Huesken ..................... 239/152
6,244,527 B1 6/2001 Ferrazza et al. ............ 239/600
6,270,278 B1 8/2001 Mauro ........................ 401/289
6,354,521 B1 3/2002 Kusilek et al. ............. 239/600
6,398,128 B1 6/2002 Hamilton et al. ............. 239/71
6,641,060 B1 * 11/2003 Brattoli et al. .............. 239/526

* cited by examiner

*Primary Examiner*—Michael Mar
*Assistant Examiner*—Darren Gorman
(74) *Attorney, Agent, or Firm*—Holland & Knight LLP

(57) ABSTRACT

A handheld spraying device having a quick disconnect assembly for releasably securing a spray body having a valve mechanism therein to a water line. The device includes a nozzle assembly affixed to a water line that includes a pair of opposed projecting wing portions that are spring biased into a pair of opposed seats formed in the spray body. An elongated opening transversely aligned with the seats is provided in the spray body for the passage of the nozzle assembly therethrough upon the wing portions thereof being aligned with the opening. Upon urging the nozzle assembly inwardly within the spray body against an interior spring so as to raise the wing portions off the seats and rotating the line and affixed nozzle assembly approximately 90° with respect to the spray body, the line and nozzle assembly can be withdrawn, disconnecting the spray body from the line.

17 Claims, 4 Drawing Sheets

HANDHELD SPRAYING DEVICE WITH QUICK DISCONNECT ASSEMBLY

BACKGROUND OF THE INVENTION

The present invention relates to a handheld spraying device adapted for at-home kitchen use and, more particularly, to such a device employing a quick disconnect feature that allows the user to replace the spraying mechanism with mechanisms of different shapes, sizes and spraying features without having to replace the connecting hose assembly.

Handheld spraying devices are becoming increasingly popular for in-home kitchen use for a variety of applications ranging from dishwashing to the spraying of vegetables. For different applications, different nozzle sizes and shapes and spraying patterns are preferred. While a variety of quick disconnect mechanisms have heretofore been developed to permit quick and easy disassembly of a spray nozzle for cleaning or replacement, such mechanisms are often relatively complicated and thus are relatively expensive to manufacture and difficult to use and/or require the use of separate tools. As a result, such devices have not met with widespread acceptance. It would be highly desirable if a disconnect assembly could be incorporated into a handheld spraying device that was of simple construction, inexpensive to manufacture and could be easily utilized to change the spraying mechanism without having to replace the connecting hose assembly and without the need for tools or complicated multi-step procedures to provide a plurality of spray features for different applications. The present invention provides such an assembly.

SUMMARY OF THE INVENTION

Briefly, the spraying device of the present invention comprises a handheld spray body that is removably mounted on a nozzle assembly fixed to a flexible water hose that is preferably retractably mounted adjacent a kitchen sink. The upper portion of the spray body defines the water spray outlet and houses a valve mechanism for selectively communicating pressurized water from the flexible hose with the spray outlet. A trigger mechanism is carried on the upper body portion for conveniently opening and closing the valve mechanism. To provide the quick disconnect of the spray body and the components housed therein, the nozzle assembly is provided with a pair of opposed radially projecting wing portions. The lower body portion of the device defines a radially oriented slot therein through which the nozzle and projecting wing portions can be readily inserted. Disposed adjacent and transversely of the radial slot are a pair of opposed seats for the wing portions of the nozzle assembly. A spring within the housing continually urges the nozzle assembly to a retracted position such that when the nozzle wing members are disposed within the seats formed in the lower body portion, the wing members are urged against their seats, securing the nozzle assembly within the lower body portion of the device with the flexible water hose in fluid communication with the spray body.

To disconnect the spray body from the water hose and affixed nozzle, it is only necessary to push the hose and nozzle a short distance into the lower portion of the body against the force of the spring therein such that the projecting wings on the nozzle will clear their respective seats. A 90° rotation of the hose relative to the spray body will then bring the wings into alignment with the slot in the lower body portion, enabling the hose and nozzle to be readily withdrawn from the spray body. To re-secure the nozzle to the same spray body or one having a different spray pattern or size, it is only necessary to realign the wing portions projecting from the nozzle with the interior slot in the lower portion of the spray body, insert the nozzle into the housing such that the wing portions pass through the slot and beyond the transversely disposed wing seats, rotate the flexible water hose and attached nozzle 90° with respect to the housing to align the wing portions with their respective seats and release the hose. The spring will press the nozzle outwardly, urging the projecting wings portion carried thereby into and against their aligned seats, thereby re-securing the hose and nozzle to the spray body.

DETAILED DESCRIPTION OF THE PREFERRED EMBODIMENT

Figure 1:
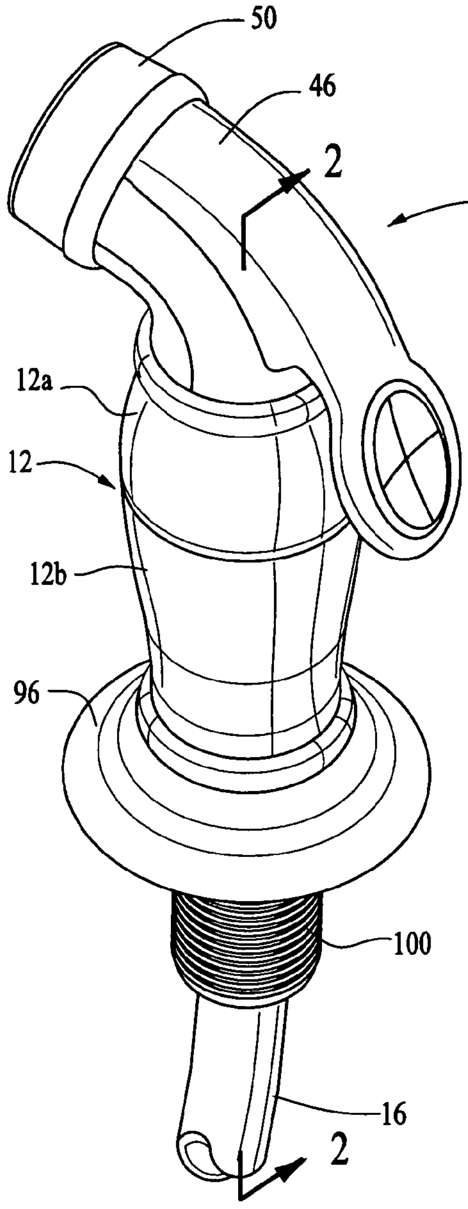
FIG. 1 is a perspective view of the spraying device of the present invention.

Referring now in detail to the drawings, the handheld spraying device 10 of the present invention comprises a body 12 that is releasably secured by a quick disconnect assembly 14 to a conventional flexible water hose 16 of the type that is typically retractably mounted adjacent a kitchen sink. Spray body 12 has an upper body portion 12*a* defining an outer depending skirt 18 extending about an interior chamber 20 and threadably engaging a lower body portion 12*b*. The upper body portion 12*a* also defines an interior depending annular wall 22 at the upper end of chamber 20. Wall 22 extends about and defines a second chamber 24 and terminates at its lower end in an inclined surface defining a valve seat 26.

A valve piston 28 is reciprocally mounted in the second chamber 24 and defines an actuator button 30 at its upper end, and an inclined annular surface 32 proximate its lower upstream end that is adapted to mate with valve seat 26. An O-ring 34 is provided in an annular recess about surface 32 so as to form a sealing engagement with valve seat 26 and define a valve mechanism 35. A second O-ring 36 is provided about valve piston 28 adjacent actuator button 30 for sealing engagement with an annular interior wall 38 so as to continually prevent any water leakage about the actuator button 30. Valve mechanism 35 also includes a first coil spring 40 that extends between a retainer 42 and a shoulder 44 formed in the upstream end of the piston 28 below valve seat 26 so as to bias the piston to the closed position illustrated in FIG. 1. Retainer 42 is fixed in the lower end of the upper portion of the spray body 12 and defines a central opening 43 for the passage of water therethrough and an annular channel 45 in the upper end thereof to receive and retain the lower end of coil spring 40. A trigger 46 for opening and closing valve mechanism 35 is pivotally mounted at its forward end 48 on the upper portion 12*a* of spray body 12 adjacent a forward end cap 50 threadably engaging the water outlet end 52 of the spray body 12. An aerator 54 is preferably disposed at the outlet end of the device within cap 50. The configuration of aerator and openings in the face of the cap in addition to the shape and size of the water outlet end will determine the spray configuration provided by the device 10.

Figure 7:
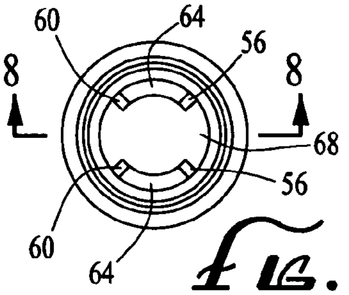
FIG. 7 is a top view of the lower portion of the spray body showing the nozzle assembly seats and transverse slot formed therein.
Figure 6:
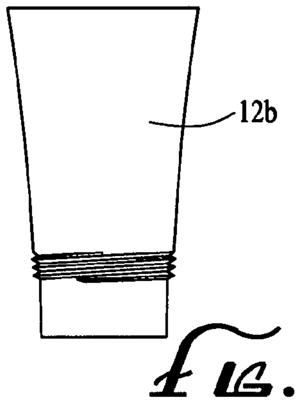
FIG. 6 is a side view of the lower portion of the spray body.
Figure 8:
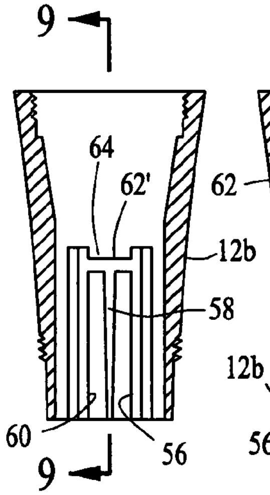
FIG. 8 is a sectional view taken along the line 8—8 of FIG. 7.
Figure 9:
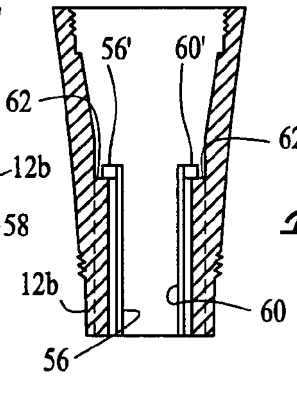
FIG. 9 is a sectional view taken along the line 9—9 of FIG. 8.
Figure 10:
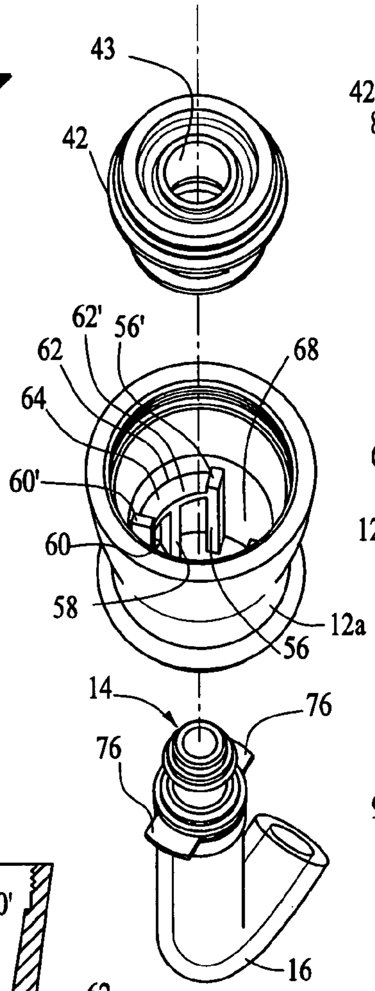
FIG. 10 is an exploded perspective view showing the nozzle assembly, the lower portion of the spray body and the retainer in axial alignment.

The lower portion 12*b* of spray body 12 defines a plurality of axially extending and circumferentially spaced ribs 56–60 on opposed sides of the interior surface thereof. A pair of arcuate horizontally disposed ribs 62, defining flat upper surfaces 62', also are formed on the interior housing wall that extend between the outer axial ribs 56 and 60. Surfaces 62' are disposed below the upper ends of ribs 56 and 60 and cooperate with said ribs to define a pair of opposed seats 64 for radially projecting wing portions of the nozzle assembly 66 (to be described). As seen in FIGS. 7 and 10, the ribs 56–62 on the interior surface of the lower body portion 12*b* occlude perimeter portions of the interior of the lower portion of the housing so as to define an elongated slot or opening 68 that is transversely disposed with respect to the nozzle assembly seats 64.

The flexible plastic or rubber water hose 16 can be provided with a standard brass fitting 70 at its upstream end for communication with a pressurized water supply. Most typically, such an attachment would secure the hose such that it would be retractably mounted adjacent a kitchen sink.

Figure 2:
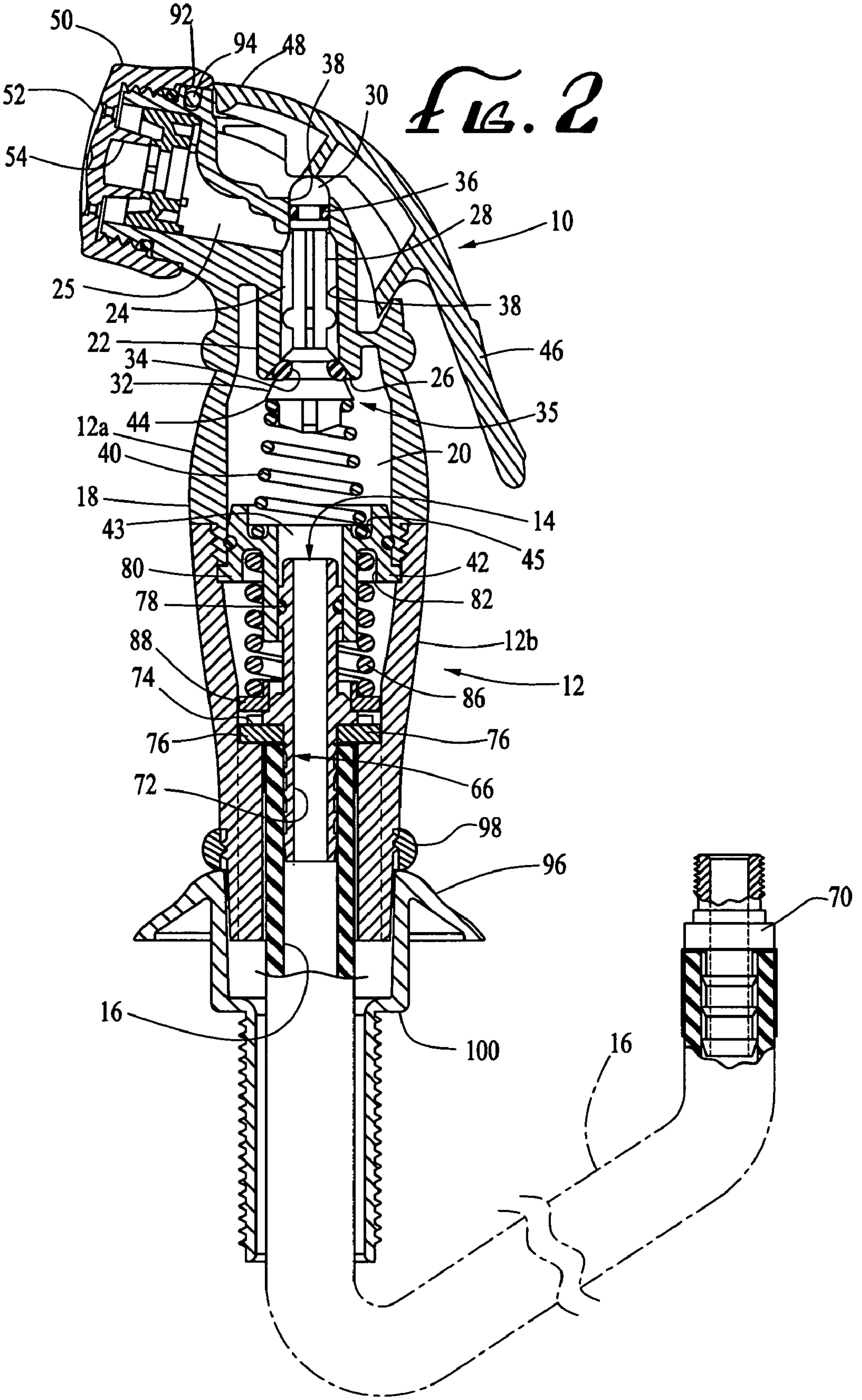
FIG. 2 is a sectional view of the spraying device of the present invention taken along line 2—2 of FIG. 1.
Figure 5:
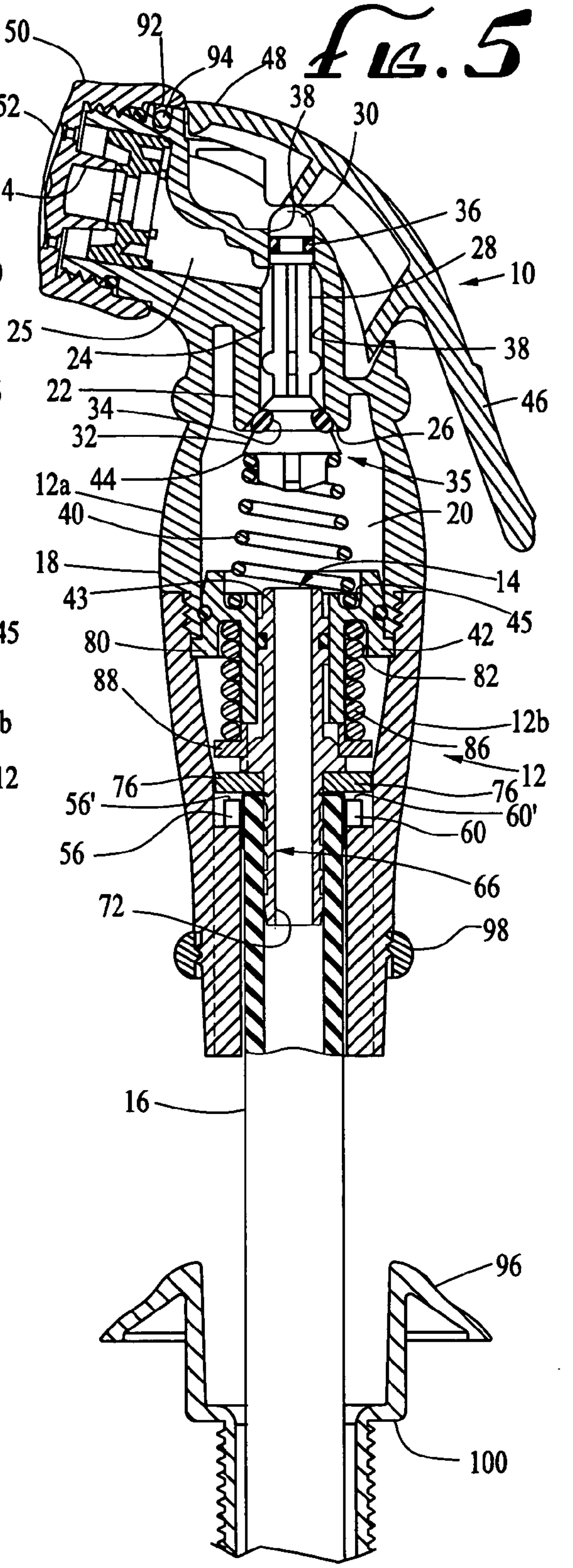
FIG. 5 is a perspective view of the present invention showing the nozzle assembly being inserted into the body portion of the spraying device during the securement of the spray body to the nozzle assembly and water line.
Figure 11:
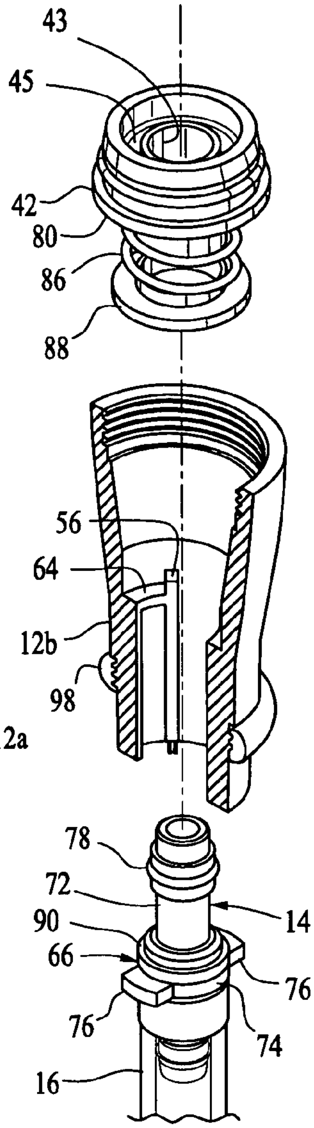
FIG. 11 is a perspective view and partial sectional view illustrating the quick disconnect assembly employed in the present invention.

The downstream end of hose 16 has a brass nozzle assembly 66 secured therein (see FIG. 2). As illustrated in FIG. 11, the nozzle assembly 66 includes an elongated nozzle 72 that projects into and is secured to hose 16 and a washer 74 defining oppositely projecting wing portions 76. Washer 74 is positioned about the nozzle 72 in a relatively snug fitment but rotatable thereon about the central longitudinal axis of the nozzle. The upper end portion of the nozzle carries an O-ring 78 in an annular groove formed therein for sealing engagement with the interior surface of a depending skirt portion 80 of retainer 42 (see FIG. 5). Retainer 42, which also supports the lower end of coil spring 40 as above described, additionally defines an annular recessed area 82 in a lower portion thereof so as to define an upper seat for a second coil spring 86. The lower end of spring 86 bears against a flat ring 88 extending about nozzle 72 above and spaced from washer 74. A flat annular support surface 90 is provided on the exterior of the nozzle to support ring 88. With the upper and lower portions 12*a* and 12*b* of the spray body 12 secured together in threaded engagement, coil spring 86 is held in a compressed state between the retainer 42 and the upper surface of support ring 88, urging the ring against the nozzle 72, pressing the nozzle assembly downwardly (as seen in FIG. 2) and the wing portions 76 of washer 74 against their respective seats 64.

Figure 3:
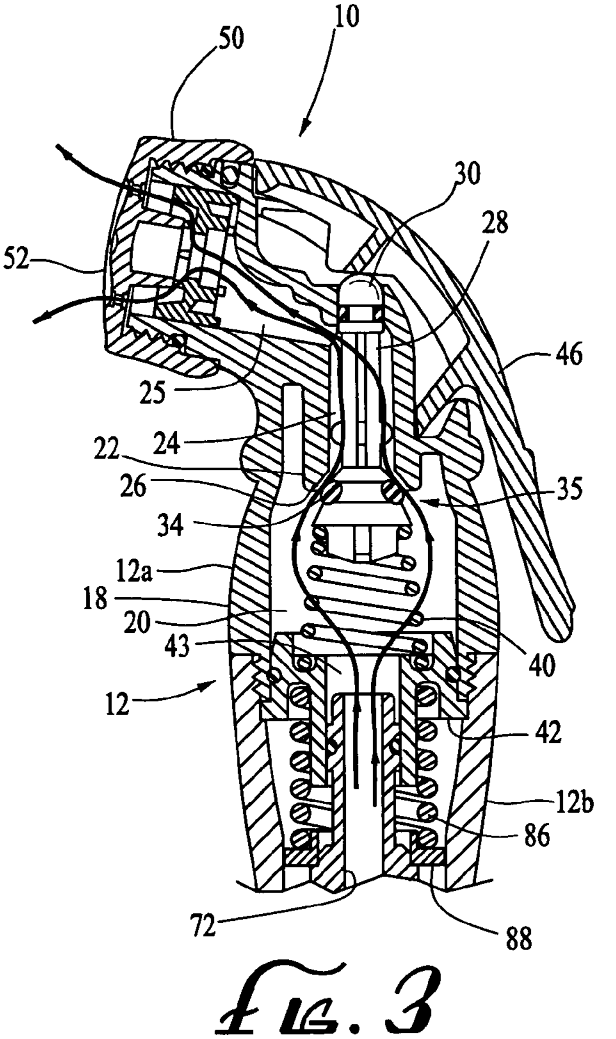
FIG. 3 is a partial sectional view of the upper portion of the spraying device of the present invention showing the valve mechanism in the open position and illustrating the flow of water therethrough.

In use, water flows through hose 16, nozzle 72 and into the first chamber 20 within the spray body 12. When the trigger 46 is pressed against the outer surface of the spray body, it pivots about its forward end 48 and depresses the actuator button 30 moving piston 28 inwardly and O-ring 34 off valve seat 26. Water under line pressure then flows into the second chamber 24 about piston 28, into a forward chamber 25 and exits the device through the forward end cap 50 as illustrated by the arrows in FIG. 3. When the trigger is released, piston 28, under the force of coil spring 40, moves upwardly bringing O-ring 34 into sealing engagement with valve seat 26 and shutting off the flow of water therebetween. To provide the pivotal mounting of trigger 46 on the body portion 12*a*, the upper body portion is provided with a slot 92 therein adapted to receive a transverse rounded forward end portion 94 of trigger 46 such that upon threadably engaging the forward end cap 50 on the forward end of the upper body portion 12*a*, cap 50 covers slot 92, securing the trigger to the spray body while allowing pivotal movement of the trigger relative to the spray body to effect depression of piston 28 and the opening and closing of the valve mechanism 35. It is to be understood, however, that other mechanisms could be employed in the present invention to define a valve mechanism for spray body 12 and to effect the opening and closing thereof to provide selective fluid flow from the spray body. In this operative position (see FIG. 2), the coil spring 86 continuously bears against ring 88, urging the ring against the nozzle 72 so as to press the wing portions 76 of the nozzle assembly 66 into and against their seats 64, securing the nozzle assembly in the spray body in a watertight configuration. As the washer 74 in nozzle assembly 66 can rotate with respect to the nozzle 72, the spray body 12 can rotate relative to the flexible hose 16 during use so as not to twist or kink the hose and thus facilitate orientation of the spray body in any desired direction.

Figure 4:
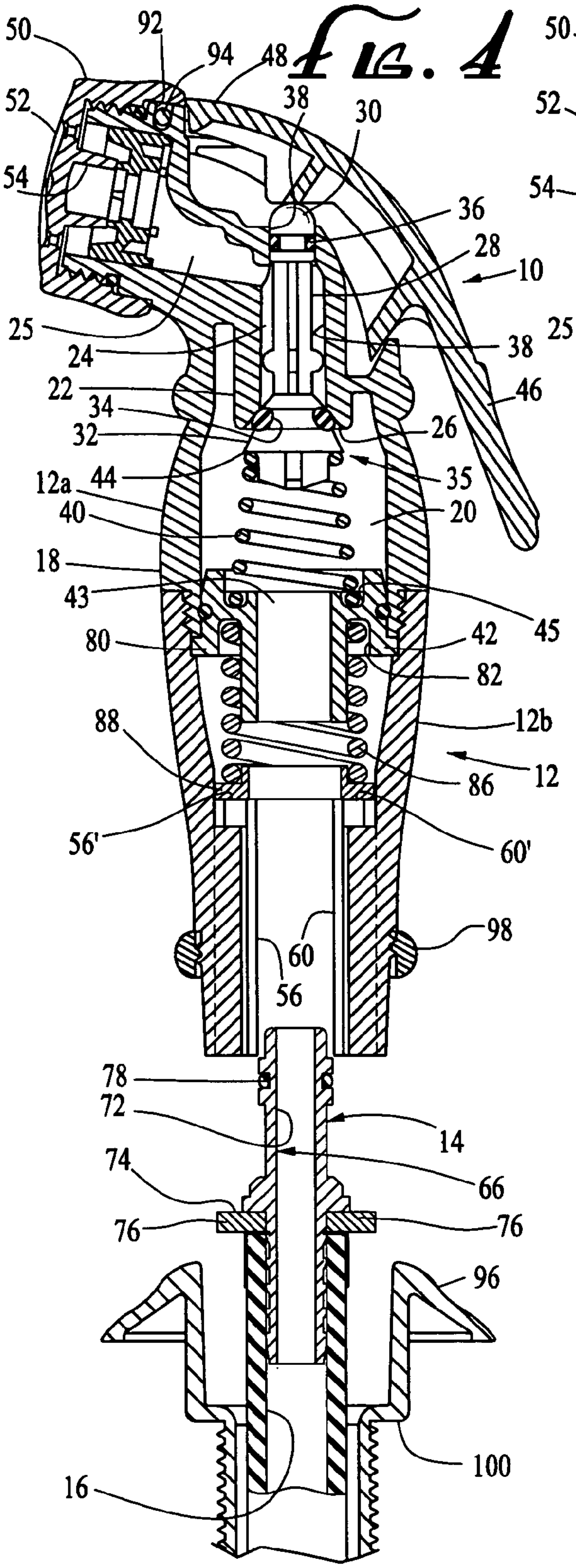
FIG. 4 is a sectional view showing the body portion of the spraying device of the present invention detached from the nozzle assembly and water line.

To remove the spray body 12 from the hose 16, it is only necessary to press the hose inwardly relative to the spray body a short distance, which will lift the wing portions 76 on washer 74 off their respective seats 64 (see FIG. 5), allowing the hose and washer assembly to be rotated relative to the spray body. By rotating the hose 90°, the wing portions of the washer, no longer restricted by seats 64, will rotate with the hose due to the fitment of the washer 74 about nozzle 72, bringing the wing portions into alignment with the transverse opening or slot 68 formed by the ribs 56–60 in the interior of the lower portion 12*b* of the spray body. The hose and nozzle assembly can then be simply withdrawn from the spray body through opening 68 for cleaning and/or replacement with a spray body having a different spray size or configuration. With the nozzle assembly removed, the axially translatable spring support ring 88 is pressed against stops defined by the upper ends 56' and 60' of ribs 56 and 60, as seen in FIG. 4. Other configurations could be employed to define the ring stops and wing seats within the lower portion 12*b* of spray body 12.

To replace the new spray body, the above-described process is simply reversed. The wing portions on the nozzle assembly are aligned with the transverse opening in the lower portion of the spray body and the nozzle assembly and hose are pushed therethrough into the spray body, compressing spring 86. The hose is then rotated 90° to align the projecting wing portions 76 upon the nozzle assembly with their respective seats 64 and released. Coil spring 86 will then press the nozzle assembly downwardly, forcing the wing portions into and against their seats, securing the new spray body to the hose.

A suitable decorative annular flange 96 is provided that fits about the lower end of housing portion 12*b* adjacent a removable bottom exterior ring 98. Flange 96 includes a downwardly extending tubular portion 100 that threadably engages a conventional water pipe (not shown) and through which the flexible hose extends and thereby provides a suitable receptacle for the spray body 12 as seen in FIG. 2.

Thus, the present invention provides a very economical and easy to use quick disconnect assembly for replacing handheld spraying mechanisms with similar mechanisms having different spray shapes and sizes without the need to replace the connecting hose assembly. Spraying device 10 is also very inexpensive to manufacture due to the minimal number of parts required and the fact that the components, if desired, can be constructed largely of inexpensive plastic and nylon materials although the nozzle assembly and fittings are preferably formed of brass. Various changes and modifications can be made in carrying out the present invention without departing from the spirit and scope thereof. Insofar as those changes and modifications are within the purview of the appended claims, they are to be considered as part of the present invention.

What is claimed is:

1. A handheld water spraying device having a quick disconnect assembly for releasably securing the device to a flexible water line, said device comprising:

- a spray body having a water inlet end and a water outlet end;
- a valve mechanism carried by said spray body for the selective passage of water therethrough;
- a nozzle assembly adapted to be fixed to the water line and releasably secured in said spray body for the passage of water from said line into said body, said nozzle assembly including a pair of opposed radially projecting wing portions;
- a pair of opposed seats formed in said spray body for receiving said wing portions of said nozzle assembly and preventing rotation of said wing portions with respect to said spray body;
- biasing means disposed within said spray body for urging said wing portions into and against said seats; and
- an elongated opening formed in said spray body proximate said inlet end thereof for the passage of said nozzle assembly therethrough upon said wing portions thereof being aligned with said opening, said opening being aligned transversely with respect to said seats such that upon urging the water line and affixed nozzle assembly inwardly within said spray body against said biasing means so as to raise said wing portions off said seats and then rotating the line and affixed nozzle assembly approximately 90° with respect to said spray body so as to align said wing portions with said opening, said line and nozzle assembly can be axially withdrawn from said spray body thereby disengaging said spray body from the line.

2. The spraying device of claim 1 wherein said nozzle assembly includes a nozzle having a water flow passageway extending axially therethrough and a washer rotatably mounted on said nozzle, said wing portions of said nozzle assembly being defined by said washer.

3. The spraying device of claim 1 wherein said nozzle assembly includes a nozzle having a water flow passageway extending axially therethrough and wherein said wing portions of said assembly are carried by and rotatable with respect to said nozzle such that upon said nozzle being secured in said spray body with said wing portions in said seats, said spray body is rotatable with respect to said nozzle whereby twisting of the water line during use is avoided.

4. The spraying device of claim 1 including a plurality of axially extending ribs formed on opposed interior sides of said spray body and a pair of opposed arcuate ribs transversing and cooperating with said axially extending ribs so as to define said nozzle seats and said transversely disposed elongated opening.

5. The spraying device of claim 1 wherein said biasing means comprises a coil spring and including a retaining member fixed within said spray body, a ring member spaced from said retaining member and being axially translatable within said spray body, said coil spring extending between said retaining member and said ring so as to urge said ring member against said nozzle assembly upon said nozzle as being inserted into said spray body and press said wing portions thereof into and against said opposed seats.

6. The spraying device of claim 4 wherein said nozzle assembly includes a nozzle having a water flow passageway extending axially therethrough and wherein said wing portions of said assembly are carried by and rotatable with respect to said nozzle such that upon said nozzle being secured in said spray body with said wing portions in said seats, said spray body is rotatable with respect to said nozzle whereby twisting of the water line during use is avoided.

7. The spraying device of claim 5 wherein said retaining member defines a cylindrical channel extending axially therethrough and upon securing said nozzle assembly in said spray body a portion of said nozzle assembly is disposed in said channel in said retaining member.

8. The spraying device of claim 6 wherein said biasing means comprises a coil spring and including a retaining member fixed within said spray body, a ring member spaced from said retaining member and being axially translatable within said spray body, said coil spring extending between said retaining member and said ring so as to urge said ring member against said nozzle assembly upon said nozzle as being inserted into said spray body and press said wing portions thereof into and against said opposed seats.

9. A handheld water spraying device having a quick disconnect assembly for releasably securing the device to a flexible water line, said device comprising:

- a spray body having a water inlet end and a water outlet end;
- a valve disposed within said spray body for the selective passage of water therethrough;
- a trigger carried by said spray body for opening and closing said valve;
- a nozzle assembly adapted to be fixed to the water line and releasably secured in said spray body, said assembly comprising an axially extending nozzle and a pair of opposed radially projecting wing portions carried by and rotatable with respect to said nozzle;
- a pair of opposed seats formed in said spray body for receiving said wing portions of said nozzle assembly and preventing rotation of said wing portions with respect to said spray body;
- biasing means disposed within said spray body for urging said wing portions into and against said seats; and
- an elongated opening formed in said spray body proximate said inlet end thereof for the passage of said nozzle assembly therethrough upon said wing portions thereof being aligned with said opening, said opening being aligned transversely with respect to said seats such that upon urging the water line and affixed nozzle assembly inwardly within said spray body against said biasing means so as to raise said wing portions off said seats and then rotating the line and affixed nozzle assembly approximately 90° with respect to said spray body so as to align said wing portions with said opening, said line and nozzle assembly can be axially withdrawn from said spray body thereby disengaging said spray body from the line.

10. The spraying device of claim 9 including a plurality of axially extending ribs formed on opposed interior sides of said spray body and a pair of opposed arcuate ribs transversing and cooperating with said axially extending ribs so as to define said nozzle seats and said transversely disposed elongated opening.

11. The spraying device of claim 9 wherein said biasing means comprises a coil spring and including a retaining member fixed within said spray body, a ring member spaced from said retaining member and being axially translatable within said spray body, said coil spring extending between said retaining member and said ring so as to urge said ring member against said nozzle assembly upon said nozzle as being inserted into said spray body and press said wing portions thereof into and against said opposed seats.

12. A handheld water spraying device having a quick disconnect assembly for releasably securing the device to a flexible water line, said device comprising:

a spray body having a lower portion defining a water inlet and an upper portion defining a water outlet, said upper portion threadably engaging said lower portion;

a valve mechanism carried by said upper portion of said spray body for the selective passage of water therethrough;

a nozzle assembly adapted to be fixed to the water line and releasably secured in said lower portion of said spray body for the passage of water from said line into said body, said nozzle assembly including a pair of opposed radially projecting wing portions;

a plurality of raised surfaces formed in said lower portion of said spray body and defining therein a pair of opposed seats for receiving said wing portions of said nozzle assembly and preventing rotation of said wing portions with respect to said spray body, said raised surfaces further defining an elongated opening proximate said seats for the passage of said nozzle assembly therethrough upon said wing portions thereof being aligned with said opening, said opening being aligned transversely with respect to said seats; and biasing means disposed within said spray body for urging said wing portions into and against said seats, whereby upon urging the water line and affixed nozzle assembly inwardly within said spray body against said biasing means so as to raise said wing portions off said seats and then rotating the line and affixed nozzle assembly approximately 90° with respect to said spray body so as to align said wing portions with said opening, said line and nozzle assembly can be axially withdrawn from said spray body thereby disengaging said spray body from the line.

13. The spraying device of claim 12 wherein said nozzle assembly includes a nozzle having a water flow passageway extending axially therethrough and a washer rotatably mounted on said nozzle, said wing portions of said nozzle assembly being defined by said washer.

14. The spraying device of claim 12 wherein said nozzle assembly includes a nozzle having a water flow passageway extending axially therethrough and wherein said wing portions of said assembly are carried by and rotatable with respect to said nozzle such that upon said nozzle being secured in said spray body with said wing portions in said seats, said spray body is rotatable with respect to said nozzle whereby twisting of the water line during use is avoided.

15. The spraying device of claim 13 wherein said biasing means comprises a coil spring and including a retaining member fixed within said spray body, a ring member spaced from said retaining member and being axially translatable within said spray body, said coil spring extending between said retaining member and said ring so as to urge said ring member against said nozzle assembly upon said nozzle as being inserted into said spray body and press said wing portions thereof into and against said opposed seats.

16. The spraying device of claim 15 wherein said retaining member defines a cylindrical channel extending axially therethrough and upon securing said nozzle assembly in said spray body a portion of said nozzle assembly is disposed in said channel in said retaining member.

17. The spraying device of claim 16 including an annular sealing member extending about said portion of said nozzle.

* * * * *